US012592088B2

(12) United States Patent     (10) Patent No.:   US 12,592,088 B2

Sultan et al.     (45) Date of Patent:    Mar. 31, 2026

(54) ANCHOR FOR LINE RECOGNITION

(71) Applicant: Robert Bosch GmbH, Stuttgart (DE)

(72) Inventors: Azhar Sultan, Tunbridge Wells (GB); Joel Janai, Leonberg (DE); Tamas Kapelner, Hildesheim (DE); Thomas Wenzel, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 596 days.

(21) Appl. No.: 18/152,225

(22) Filed: Jan. 10, 2023

(65) Prior Publication Data

US 2023/0230394 A1     Jul. 20, 2023

(30) Foreign Application Priority Data

Jan. 18, 2022   (DE) ..................... 10 2022 200 498.1
Sep. 9, 2022   (DE) ..................... 10 2022 209 409.3

(51) Int. Cl.
    *G06V 20/56*     (2022.01)
    *G06V 10/25*     (2022.01)
    *G06V 10/44*     (2022.01)

(52) U.S. Cl.
    CPC ............ *G06V 20/588* (2022.01); *G06V 10/25* (2022.01); *G06V 10/44* (2022.01)

(58) Field of Classification Search
    CPC ....... G06V 20/588; G06V 10/25; G06V 10/44
    See application file for complete search history.

(56) References Cited

U.S. PATENT DOCUMENTS

2019/0271550 A1*   9/2019   Breed ................ G01C 21/3811
2020/0279395 A1*   9/2020   Buda ...................... G01C 21/30

OTHER PUBLICATIONS

Xu et al., "CurveLane-NAS: Unifying Lane-Sensitive Architecture Search and Adaptive Point Blending" (published at https://arxiv.org/pdf/2007.12147, Jul. 2020).*

Qiao, et al.: "IA Lane Recognition Based on Line-CNN Network," 2020 Asia-Pacific Conference on Image Processing, Electronics and Computers (IPEC). IEEE (2020), pp. 96-100.

Qin, et al.: "Ultra Fast Structure-aware Deep Lane Detection," arXiv:2004.11757v4, (2020), pp. 1-16.

Tabelini, et al.: "Keep your Eyes on the Lane: Real-time Attention-guided Lane Detection," arXiv:2010.12035v2, (2020), pp. 1-9.

* cited by examiner

*Primary Examiner* — Casey L Kretzer

(74) *Attorney, Agent, or Firm* — NORTON ROSE FULBRIGHT US LLP

(57)        ABSTRACT

A method for determining at least one anchor for an anchor-based lane line recognition and/or roadway marking recognition in a digital image representation on the basis of sensor data that are obtained from at least one surroundings sensor of a system. The method includes at least the following steps: a) receiving a digital image representation, b) setting at least one row or one column of possible anchors in at least one area of the digital image representation, the row or column of possible anchors being situated at a distance from at least the upper and lower or left and right edge of the area of the digital image representation.

9 Claims, 5 Drawing Sheets

ANCHOR FOR LINE RECOGNITION

CROSS REFERENCE

The present application claims the benefit under 35 U.S.C. § 119 of German Patent Application Nos. DE 10 2022 200 498.1 filed on Jan. 18, 2022, and DE 10 2022 209 409.3 filed on Sep. 9, 2022, which are expressly incorporated herein by reference in their entireties.

FIELD

The present invention relates to a method for determining at least one anchor for an anchor-based lane line recognition and/or roadway marking recognition in a digital image representation on the basis of sensor data that are obtained from at least one surroundings sensor of a system, advantageously, of a vehicle.

BACKGROUND INFORMATION

Anchor-based traffic lane recognition networks have been previously inspired by typical one-step object recognition pipelines. One main difference to standard object recognition pipelines is the anchors used. For example, the standard bounding boxes of objects may be replaced by lines having different start positions and orientations, which are represented by a series of points. The position of the anchor is usually fixed on the left/right and lower edge of the image, as is illustrated, for example, by the box in FIG. 2. This is achieved by cutting the left/right column and the lower row of the last feature map out of the backbone and ignoring the remaining portion of the feature map.

SUMMARY

According to the present invention, a method is provided for determining at least one anchor for an anchor-based lane line recognition and/or roadway marking recognition in a digital image representation on the basis of sensor data that have been obtained from at least one surroundings sensor of a system, advantageously of a vehicle. According to an example embodiment of the present invention, the method includes at least the following steps:
   a) receiving a digital image representation, in particular, including a plurality of features that represent the image content,
   b) setting at least one row or one column of possible anchors in at least one area of the digital image representation, the row or column of possible anchors being situated at a distance from at least the upper and lower or left and right edge of the area of the digital image representation.

The method may further optionally including the following step:
   c) advantageously determining at least one anchor from the possible anchors, in particular, based on pieces of information obtained from features of the digital image representation.

To carry out the method, steps a) and b) and, optionally, c) may be carried out, for example, at least once and/or repeatedly or multiple times in succession in the order indicated. Furthermore, steps a) and b) and, optionally, c) may be carried out at least partially in parallel or simultaneously.

The method is used, in particular, for better positioning anchors for the line recognition or for line recognition networks for detecting driving area boundaries. A particularly advantageous, efficient and/or effective position in this context for setting or placing anchors for the traffic lane detection is the center line of an area of the digital image representation under consideration.

According to an example embodiment of the present invention, at least one anchor or every anchor may have the form of at least one line or of a line-shaped anchor. At least one anchor or every anchor may have a start position (anchor point) and at least one orientation. The one anchor or every anchor may include a plurality of lines having different orientations. The lines may begin at the same start position or at the same anchor point or may extend through these. The row or column of possible anchors may be formed by a plurality of adjoining boxes, each of which includes at least one possible anchor/start point. At least one anchor or every anchor may have the form of an origin of a coordinate system. The coordinate system may be adapted or adaptable to the intended use of the traffic lane detection and/or roadway marking detection.

The at least one surroundings sensor may, for example, include a camera sensor, a video sensor, a radar sensor, a LIDAR sensor, an ultrasonic sensor, a motion sensor and/or an infrared sensor. The system may, for example, be an object recognition system for a vehicle. The vehicle, may, for example, be a motor vehicle such as, for example, an automobile. The vehicle may, for example, be configured for an at least semi-automated or autonomous driving operation.

In step a), a digital image representation is received. The digital image representations may include or be formed with a plurality of features, the features being able to represent the image content. One example of a corresponding image representation may, for example, be specified in the form of a feature-based surroundings representation such as, for example, a feature map or view of at least one section from a feature map. Alternatively or cumulatively, the digital image representation may be provided in the form of a digital surroundings image, the surroundings image being advantageously linked to pieces of information about the features and/or the objects (sensorily) detectable in the surroundings image. A corresponding digital image representation in the form of a feature map or including pieces of feature information may be particularly advantageously generated with the aid of, and received by, a so-called backbone. The backbone may, for example, be formed in a digital image with the aid of a separate image recognition module and/or module for feature recognition and/or object recognition. The backbone may advantageously be formed with the aid of a section of an artificial neural network provided especially for this purpose.

In step b), at least one row or column of possible anchors is set in at least one area of the digital image representation, the row or column of possible anchors being situated at a distance from at least the upper and lower or left and right edge of the area of the digital image representation. In step b) at least one row (horizontal row) of possible anchors is advantageously set in at least one area of the digital image representation, the row of possible anchors being situated at a distance from at least the upper and lower edge of the area of the digital image representation. A "possible anchor" is understood to mean, in particular, a type of placeholder, which may refer to a point at which an anchor may possibly be set. In one row, for example, numerous possible anchors may be situated (horizontally) next to one another. In particular, numerous possible anchors situated, for example, in the form of multiple boxes (horizontally) next to one another may contribute to the formation of the rows. In one column, for example, numerous possible anchors may be situated (vertically) above one another. In particular, numerous possible anchors situated, for example, in the form of multiple boxes (vertically) above one another, may contribute to the formation of the rows.

In step c), at least one anchor may optionally or advantageously be determined from the possible anchors, in particular, based on pieces of information obtained from features of the digital image representation. This may include, for example, selecting at least one or exactly one suitable anchor from a series or a row or a column of possible anchors. For example, an anchor may be determined or established in the area of a series or row or column of possible anchors, in which a lane line and/or roadway marking detectable from the features of the digital image representation intersect or cross the series or row or column of possible anchors.

According to one advantageous embodiment of the present invention, it is provided that the digital image representation includes a feature map or is provided in the form of such a feature map. The feature map may, for example, describe the image content contained in the digital image representation in the form of a map of the surroundings in front of the surroundings sensor. The feature map may contain as features, in particular, lane lines and/or roadway markings if these are included in the image content. To set the at least one row or column of possible anchors, a corresponding row or column may, for example, be cut from the digital image representation or from the feature map. In the case of such a cut, for example, only the features from this row or column may be used for determining an advantageously suitable anchor. Alternatively or cumulatively, a combining or merging of features from the feature map may take place, in particular, along an anchor line and/or along a column or row of the digital image representation.

According to one further advantageous embodiment of the present invention, it is provided that the row or column of possible anchors is situated in a central area or at a central point between the upper and lower or left and right edges of the area of the digital image representation. The row or column of possible anchors is situated preferably in the middle between the upper and lower or left and right edge of the area of the digital image representation.

According to one further advantageous embodiment of the present invention, it is provided that for at least one anchor, the features are combined along a line or roadway marking. Such a combining is also referred to in digital image data processing as "pooling." This may advantageously contribute to having a higher information density or a better basis of decision-making for a selection of one or of multiple suitable anchors in the particularly relevant area (row or column of possible anchors).

According to one further advantageous embodiment of the present invention, it is provided that for at least one anchor, a column-wise and/or row-wise combining/pooling of features is carried out. This, too, may advantageously contribute to having a higher information density or a better basis of decision-making for a selection of one or of multiple suitable anchors in the particularly relevant area (row or column of possible anchors).

According to one further advantageous embodiment of the present invention, it is provided that a first row of possible anchors is set in an upper area and a second row of possible anchors is set in a lower area of the digital image representation. This may advantageously contribute to multiple areas in the same image representation being able to be examined. Multiple anchor positions may be used, for example, in order to advantageously specialize in various tasks. Traffic lanes even at a greater distance may also be particularly advantageously recognized with the aid of areas or anchors situated above one another.

According to one further advantageous embodiment of the present invention, it is provided that a deep learning algorithm is used for carrying out at least a part of the method. The deep learning algorithm may be implemented preferably using at least one artificial neural network. Input data for the deep learning algorithm or for the artificial neural net(work) may, for example, be one or multiple digital images. Output data of the deep learning algorithm or the artificial neural net(work) may, for example, be one or multiple suitable positions for the anchor and/or a piece of information about the position of at least one lane line (ascertained with the aid of the anchor) and/or roadway marking.

According to one further aspect of the present invention, a computer program is provided for carrying out a method presented herein. In other words, this relates, in particular, to a computer program (computer program product) that includes commands which, when the program is executed by a computer, prompt the computer to carry out a method described herein.

According to one further aspect of the present invention, a machine-readable memory medium is provided, on which the computer program provided herein is placed or stored. The machine-readable memory medium is regularly a computer-readable data medium.

According to one further aspect of the present invention, an object recognition system for a vehicle is provided, the system being configured for carrying out a method described herein. The system may include, for example, a computer and/or a control unit (controller), which is able to execute commands in order to carry out the method. For this purpose, the computer or the control unit may, for example, execute the specified computer program. For example, the computer or the control unit may access the specified memory medium in order to be able to execute the computer program.

The details, features and advantageous embodiments of the present invention discussed in conjunction with the method may accordingly also appear in the computer program presented herein and/or in the memory medium and/or in the system and vice versa. In this respect, reference is made in full to the explanations there for a more detailed characterization of the features.

The approach presented herein as well as its technical background are explained in greater detail below with reference to the figures. It should be noted that the present invention is not intended to be limited by the exemplary embodiments shown. In particular, it is also possible, unless explicitly represented otherwise, to extract partial aspects of the subject matter explained in the figures and to combine them with other components and/or findings from other figures and/or from the present description.

DETAILED DESCRIPTION OF EXAMPLE EMBODIMENTS

Figure 1:
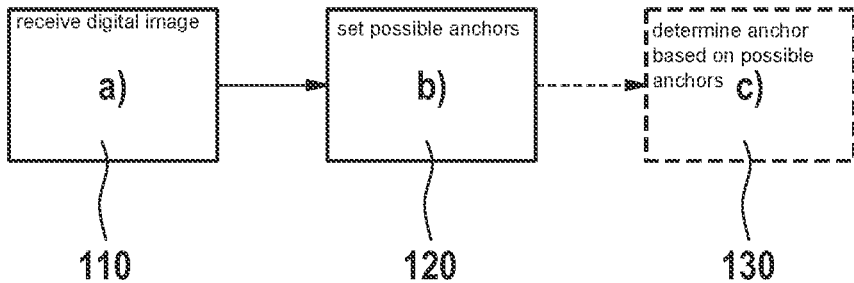
FIG. 1 schematically shows an exemplary flowchart of the method presented herein, according to the present invention.

FIG. 1 schematically shows an exemplary flowchart of the method presented herein. The method is used for determining at least one anchor 1 for an anchor-based lane line recognition and/or roadway marking recognition in a digital image representation 2 on the basis of sensor data that are obtained from at least one surroundings sensor 3 of a system 4, advantageously of a vehicle 5. The order of steps a) and b) and, optionally, c) represented by blocks 110 and 120 and, optionally, 130 is exemplary and may, for example, be run through at least once in the order represented for carrying out the method.

In block 110, a digital image representation 2 is received according to step a), in particular, including a plurality of features 6, which represent the image content. In block 120, at least one row 7 or column 8 of possible anchors 1 is set according to step b) in at least one area 9 of digital representation 2, row 7 or column 8 of possible anchors 1 being situated at a distance from at least the upper and lower or left and right edge 10 of area 9 of digital image representation 2. In block 130, at least one anchor 1 may be determined from the possible anchors 1 according to an optional step c), in particular, based on pieces of information obtained from features 6 of digital image representation 2.

The present invention advantageously provides better strategies for positioning anchors for the line recognition or for line recognition networks. Instead of the fixed positioning at the edges of the image, it is advantageous to place anchors at a more central point of the feature maps. An advantageous position of the anchors may be determined on the basis of the application and/or the data distribution. One advantageous, efficient and/or effective position for placing anchors for the traffic lane application is the center line as represented, for example, in FIG. 3.

At least one anchor or every anchor 1 may have the form of at least one line or a line-shaped anchor. At least one anchor or every anchor 1 may have a start position (anchor point) 13 and at least one orientation 14. The anchor or every anchor 1 may include a plurality of lines 14 having different orientations. Lines 14 may start at, or extend through, the same start position or the same anchor point 13. The row or column of possible anchors 1 may be formed by a plurality of adjoining boxes 15, each of which includes at least one possible anchor 1/start point 13. At least one anchor or every anchor 1 may have the form of an origin of a coordinate system. The coordinate system may be adapted or adaptable to the intended use of the traffic lane detection and/or roadway marking detection.

Figure 2:
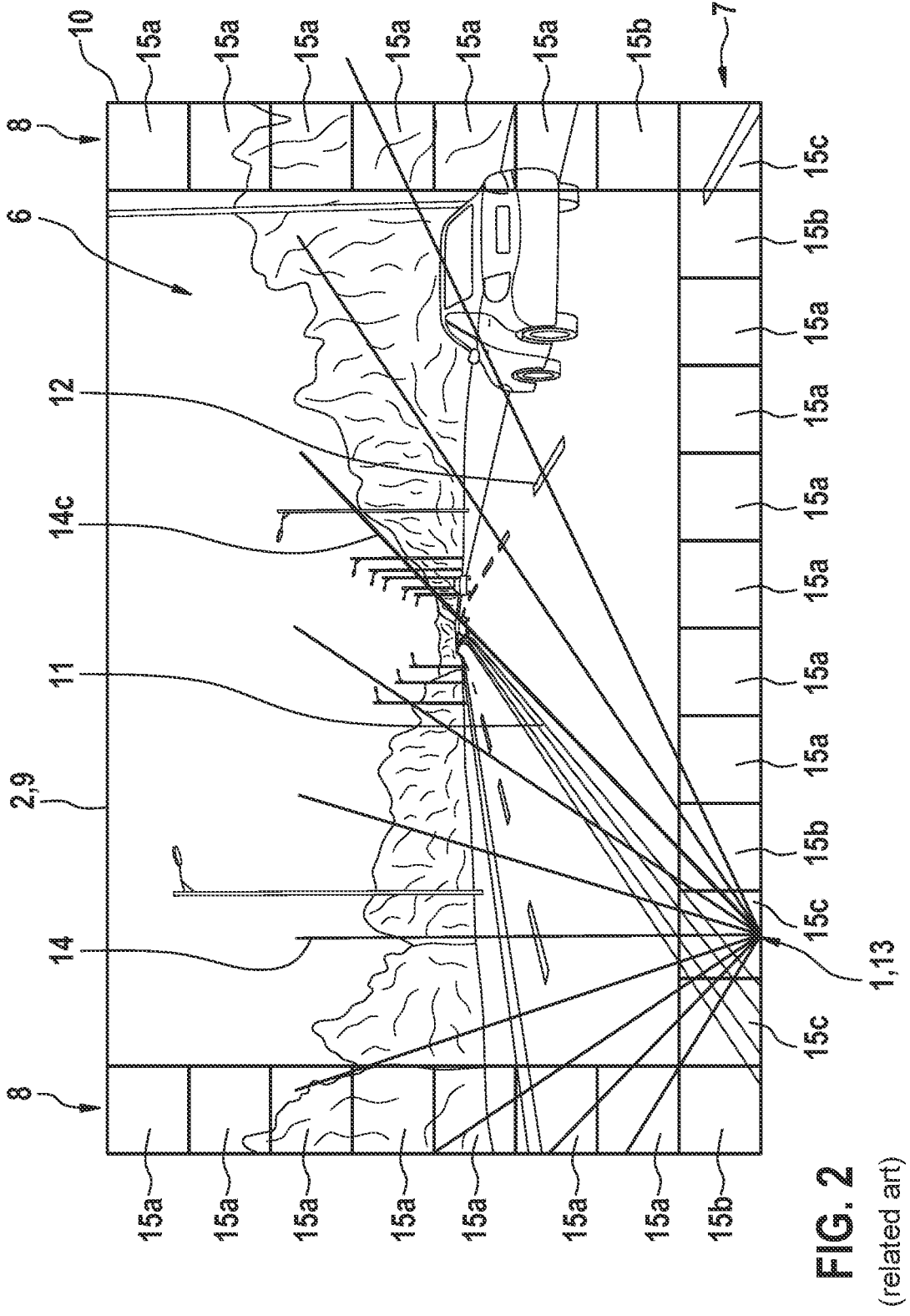
FIG. 2 schematically shows an exemplary application of an anchor-based lane line recognition and/or roadway marking recognition according to the related art.

FIG. 2 schematically shows an exemplary application of an anchor-based lane line recognition and/or roadway marking recognition according to the related art. In the related art, the position of anchor 1 is fixed on the left/right and lower edge of the image as illustrated by boxes 15 in FIG. 2. This is achieved in the related art by cutting the left/right column and the lower row of the last feature map from the backbone and by ignoring the remaining portion of the feature map.

It is apparent that boxes 15 are situated relative to a left-hand column 8 and to a right-hand column 8 and to a lower row 7 of possible anchors 1. Furthermore, recognized features 6 such as, for example, lane lines 11 and roadway markings 12, are represented in the illustration according to FIG. 2. Boxes 15*a* are those boxes in the area of which no lane lines 11 or roadway markings 12 have been detected. Boxes 15*b* are boxes in the area or surroundings of which lane lines 11 or roadway markings 12, respectively, have been detected. Boxes 15*c* are boxes in which a suitable anchor point 13 may be situated, for example, because lane lines 11 or roadway markings 12 extend through the former. In addition to anchor point 13, anchor 1 includes here, for example, also possible anchor lines 14. An anchor line selected here by way of example as particularly suitable is marked with 14*c*. This anchor line has been selected because it extends preferably in parallel to lane line 11 or, in particular, does not intersect the latter.

Figure 3:
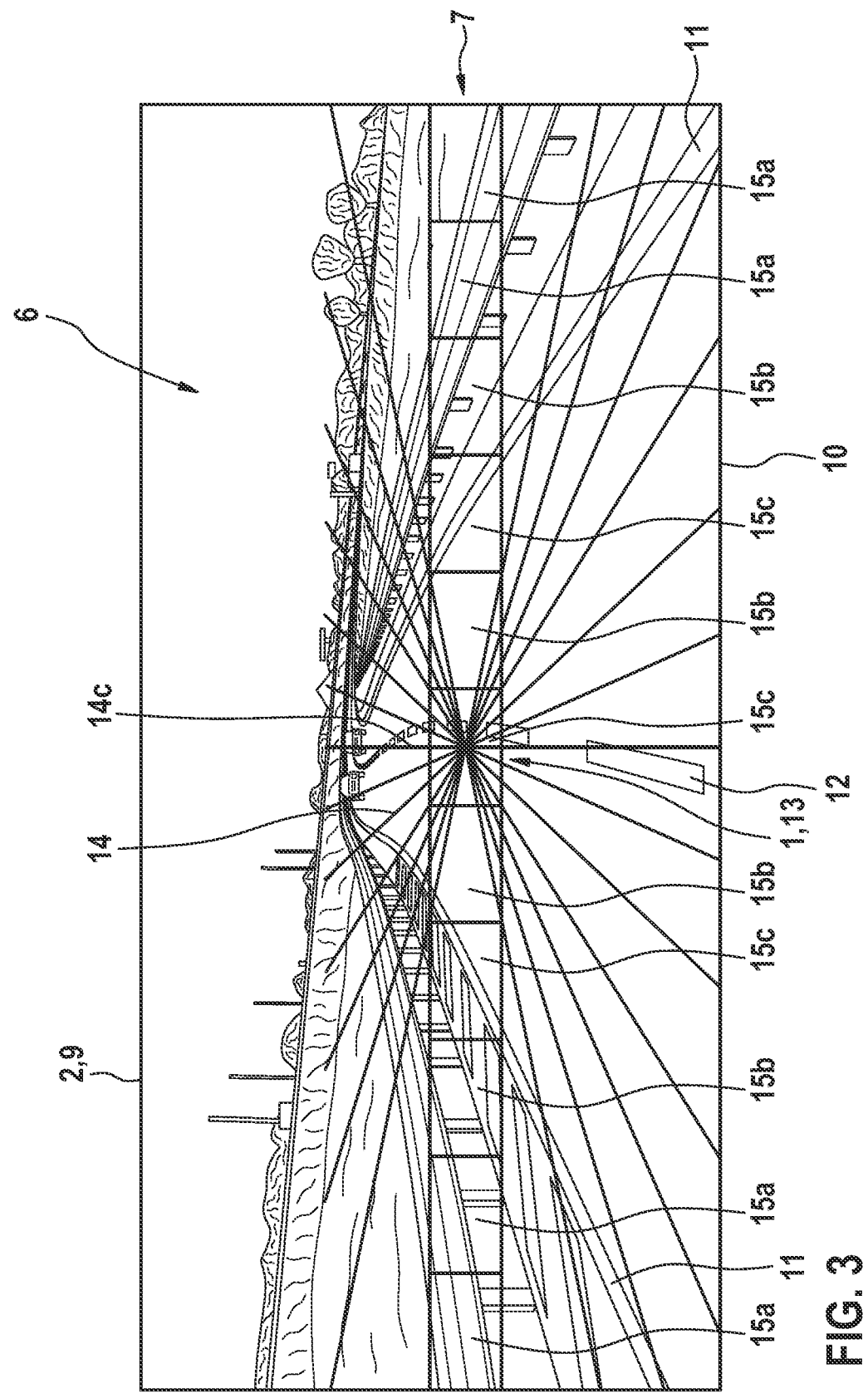
FIG. 3 schematically shows an exemplary application of an anchor-based lane line recognition and/or roadway marking recognition according to one advantageous embodiment variant of the method presented herein, according to the present invention.

FIG. 3 schematically shows an exemplary application of an anchor-based lane line recognition and/or roadway marking recognition according to one advantageous embodiment variant of the method presented herein. It is apparent that a row 7 of possible anchors 1 is situated more centrally than in the related art. This may advantageously contribute to a single row 7 of possible anchors 1 being able to be sufficient. This may therefore contribute to a more efficient and more effective positioning of anchors for use in traffic lanes.

The advantageously provided central (more central) position of anchors 1 may have multiple advantages:

The effective receptive box of extracted features 6 may be significantly larger than the effective receptive box at edge 10 (in the case of center row 7, it may double in size), since a smaller portion is situated outside the feature map. This may ensure a better utilization of extracted features 6 from the backbone.

Resulting anchors 1 may have display capabilities similar to the original strategy, since anchors 1 also cover the edge areas as is apparent, for example, in FIG. 3.

The positioning of anchors 1 may be more efficient, since fewer anchors 1 are necessary (left and right side/column may be saved).

Multiple locations (rows or columns) may be used in parallel in order to represent various types of lines (for example, roadway markings 12 and roadsides 11).

Thus, FIG. 3 illustrates an example of, and optionally of how, row 7 or column 8 of possible anchors 1 may be situated in a central area or at a central point or advantageously in the middle between the upper and lower or left and right edge 10 of area 9 of digital image representation 2.

The method may operate using data such as, for example, digital images, which may be obtained by receiving sensor signals, for example, from video-, radar-, LIDAR-, ultrasonic-, motion-, infrared images or -sensors.

The method includes, in particular, the recognition of the presence of objects in the sensor data, in particular, of traffic lanes 11 and/or of other types of line-based road markings 12.

The method operates using images; thus an image recording may be used, which serves as input for the method.

For example, digital image representation 2 may include a feature map or may be provided in the form of one.

Furthermore, it may be advantageous if, in the method, features 6 are combined (pooled) for at least one anchor 1 along a line 11, 14 or roadway marking 12. This may be advantageously applied, for example, to center box 15c and to center roadway marking 12 in FIG. 3.

Figure 4:
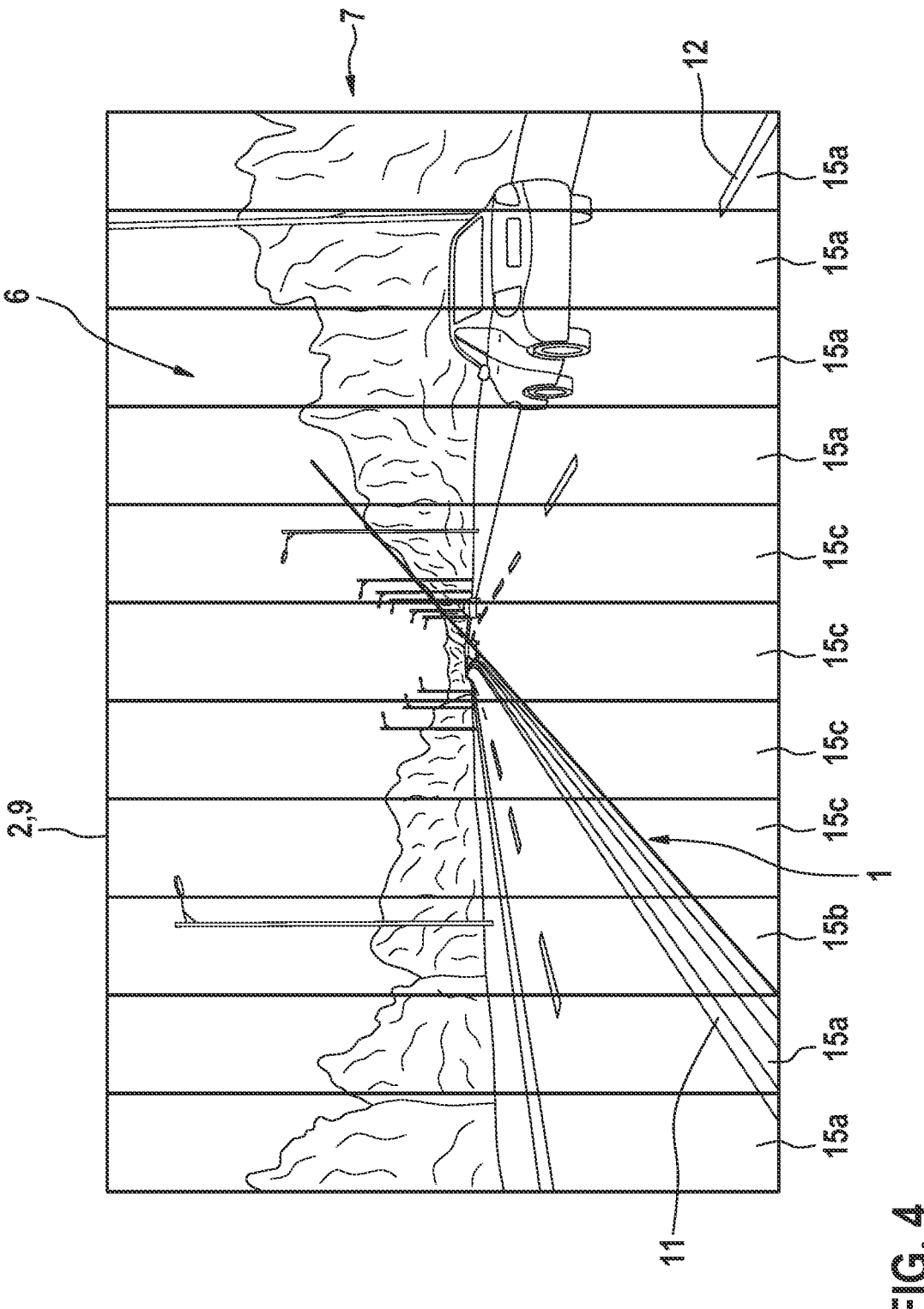
FIG. 4 schematically shows one further exemplary application of an anchor-based lane line recognition and/or roadway marking recognition according to one advantageous embodiment variant of the method presented herein, according to the present invention.

FIG. 4 schematically shows one further exemplary application of an anchor-based lane line recognition and/or roadway marking recognition according to one advantageous embodiment variant of the method presented herein.

In this context, FIG. 4 shows an example of a column-wise pooling for anchors 1 in the middle of row 7. The last feature map of the backbone is pooled along the columns that result from anchors 2 created in the center row, as shown in FIG. 3. In this strategy, features 6 are collected from the entire feature map 2 of the backbone, whereas anchors 1 are created only in center row 7.

The represents one example of, and optionally of how, a column-wise and/or row-wise combining (pooling) of features 6 may be carried out for at least one anchor 1.

Previously used anchors 1 are located at the left, right and lower edge of the image (see FIG. 2). This strategy has been provided since the lower anchors are normally not able to represent roadway markings 11, 12 that go beyond left or right image edge 10.

The selection of a more central position for anchors 1, however, has multiple advantages, as mentioned above. For the traffic lane application, in particular, center row 7 provides an advantageously efficient and/or effective position for anchors 1. It may also represent roadway markings 11, 12 that cross left or right image edge 10 and is simultaneously more efficient since fewer anchors 1 may be sufficient.

One particular advantage is the location of anchors 1. For example, a backbone may be used in order to extract features 6 from an input image. Anchors 1 may be generated or placed, in particular, in center row 7 on final feature map 2 of the backbone.

Various strategies may be used to detect the pieces of information from the feature map:

cut: it is advantageous that only features 6 of this row 7 are used and the remainder of feature map 2 is ignored.

Combination/pooling along anchors 1: features 6 are advantageously combined along line 11, 14 for each anchor point 13. This may preferably include merging or combining the pieces of information from feature map 6 along anchor line(s) 14.

Column-wise/row-wise combining/pooling: a column-wise or row-wise combining or pooling may be advantageously applied. In the case of anchors 1 in center row 7, a column-wise pooling would collect features 6 from each column defined by anchor position 13 as represented, for example, in FIG. 4. In contrast to the pooling along anchors 1, this strategy may also detect the pieces of information of entire feature map 2; it is, however, advantageously more efficient (one pooling per anchor position instead of one pooling per anchor position and orientation) and easier to implement.

In addition to an advantageous positioning of anchors 1, it is possible to use multiple anchor positions in order to advantageously specialize in various tasks. A typical problem in the case of traffic lane recognition is the exact recognition of traffic lanes 11, 12 also at a great distance. This could be solved by two anchor rows, one of which is specialized in the lower portion of the image and one in the upper portion of the image.

This represents one example of, and optionally of how, a first row 7 of possible anchors 1 may be set in an upper area and a second row 7 of possible anchors may be set in a lower area of digital image representation 2.

One further problem connected with the traffic lane recognition is the recognition of roadsides in the image. While roadsides also appear in the vicinity of roadway markings, there is generally a strong difference in appearance. This may be solved by the creation of anchors 1 in the same center row, one being specialized in roadway markings and the other in roadsides.

The method may include at least one of the following conditions:

no line-shaped anchors 1 are generated at image edge 10.

a column-wise or row-wise pooling of features 6 is used with line-shaped anchors 1.

line-shaped anchors 1 that are specialized in various tasks are used in parallel.

Figure 5:
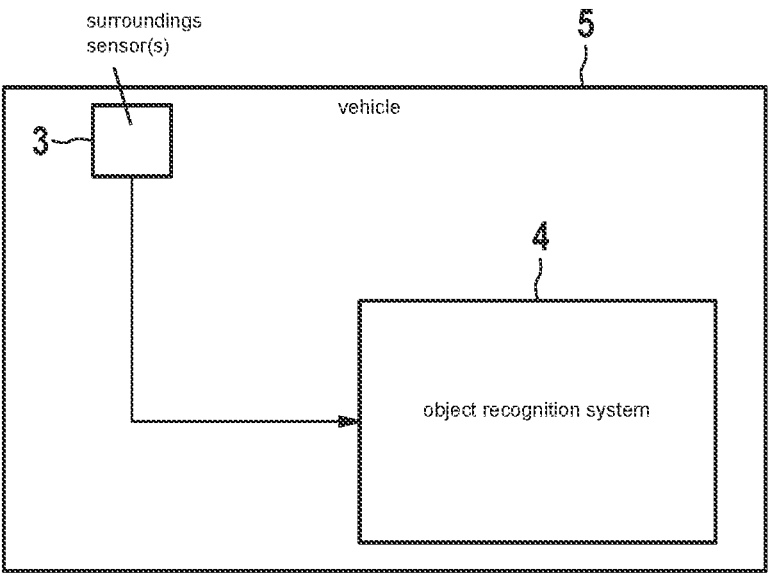
FIG. 5 schematically shows an example of a vehicle including an object recognition system described herein, according to the present invention.

FIG. 5 schematically shows one example of a vehicle 5 including an object recognition system 4 described herein. Object recognition system 4 is configured for carrying out the method described herein. Object recognition system 4 may receive, for example, data from surroundings sensor 3.

A deep learning algorithm may be used, for example, for carrying out at least one part of the method, the deep learning algorithm being implemented preferably using at least one artificial neural network, which may be implemented, for example, in object recognition system 4.

In one specific embodiment, generalized anchors are provided for the traffic lane recognition using deep learning.

In principle, the method may be used for calculating a control signal for the control of a physical system 4 such as, for example, of a computer-controlled machine, of a robot, of a vehicle 5, of a household appliance, of a power tool, of a manufacturing machine, of a personal assistant or of an access control system.

What is claimed is:

1. A vehicle control method performed using a processor system of the vehicle, the processor system including at least one processor, the method comprising at least the following steps:

a) receiving, by the processor system and from one or more sensors of a vehicle, a digital image representation of surroundings of the vehicle sensed by the one or more sensors while the vehicle is driving;

b) processing, by the processor system, the digital image representation to detect one or more roadway features in the image;

c) overlaying, by the processor system, the digital image representation with (i) a first predefined row of anchors that each has a respective plurality of fan lines extending upward and downward therefrom, the first predefined row being located in a horizontal area of the digital image representation that is offset from both an upper edge and a lower edge of the digital image representation, and/or (ii) a first predefined column of anchors that each has a respective plurality of fan lines extending rightward and leftward therefrom, the first predefined column being located in a vertical area of the digital image representation that is offset from both a left edge and a right edge of the digital image representation;

d) analyzing, by the processor system executing a trained neural network, a relationship between the detected roadway features and the overlaid fan lines to identify one or more of the fan lines corresponding to predefined roadway markings, and, based on the identification, associating, for each of at least one of the one or more identified fan lines, a respective plurality of the detected roadway features with the respective identified fan line; and e) controlling, by the processor system, the autonomous driving operation of the vehicle based on the roadway features associated with the one or more identified fan lines.

2. The method as recited in claim 1, wherein the processing includes generating a feature map of the one or more roadway features.

3. The method as recited in claim 1, wherein the first predefined row is overlaid and is situated in a central area or at a central point between the upper and lower edges of the area of the digital image representation.

4. The method as recited in claim 1, wherein the associating includes combining a subset of the plurality of the detected roadway features along at least one of the identified fan lines, forming a representation of at least a portion of a roadway marking.

5. The method as recited in claim 1, wherein for at least one of the anchors, a column-wise and/or row-wise combining of the one or more roadway features is carried out.

6. The method as recited in claim 1, wherein the first predefined row of anchors is set in an upper area of the digital image representation and a second predefined row of anchors is set in a lower area of the digital image representation.

7. The method as recited in claim 1, wherein the first predefined column is overlaid and is situated in a central area or at a central point between the left and right edges of the digital image representation.

8. A non-transitory machine-readable memory medium on which is stored a computer program that is executable by a computer of a vehicle and that, when executed by the computer, causes the computer to perform a method controlling the vehicle, the method comprising the following steps:

a) receiving, from one or more sensors of a vehicle, a digital image representation of surroundings of the vehicle sensed by the one or more sensors while the vehicle is driving;

b) processing the digital image representation to detect one or more roadway features in the image;

c) overlaying the digital image representation with (i) a first predefined row of anchors that each has a respective plurality of fan lines extending upward and downward therefrom, the first predefined row being located in a horizontal area of the digital image representation that is offset from both an upper edge and a lower edge of the digital image representation, and/or (ii) a first predefined column of anchors that each has a respective plurality of fan lines extending rightward and leftward therefrom, the first predefined column being located in a vertical area of the digital image representation that is offset from both a left edge and a right edge of the digital image representation;

d) analyzing, by executing a trained neural network, a relationship between the detected roadway features and the overlaid fan lines to identify one or more of the fan lines corresponding to predefined roadway markings, and, based on the identification, associating, for each of at least one of the one or more identified fan lines, a respective plurality of the detected roadway features with the respective identified fan line; and e) controlling the autonomous driving operation of the vehicle based on the roadway features associated with the one or more identified fan lines.

9. An object recognition system for a vehicle, the system comprising:

a sensor system that includes one or more sensors; and a processor system that includes one or more processors, wherein the processor system, for controlling the vehicle, is configured to:

a) receive, from the sensor system, a digital image representation of surroundings of the vehicle sensed by the one or more sensors while the vehicle is driving;

b) process the digital image representation to detect one or more roadway features in the image;

c) overlay the digital image representation with (i) a first predefined row of anchors that each has a respective plurality of fan lines extending upward and downward therefrom, the first predefined row being located in a horizontal area of the digital image representation that is offset from both an upper edge and a lower edge of the digital image representation, and/or (ii) a first predefined column of anchors that each has a respective plurality of fan lines extending rightward and leftward therefrom, the first predefined column being located in a vertical area of the digital image representation that is offset from both a left edge and a right edge of the digital image representation;

d) analyze, by executing a trained neural network, a relationship between the detected roadway features and the overlaid fan lines to identify one or more of the fan lines corresponding to predefined roadway markings, and, based on the identification, associate, for each of at least one of the one or more identified fan lines, a respective plurality of the detected roadway features with the respective identified fan line; and e) control the autonomous driving operation of the vehicle based on the roadway features associated with the one or more identified fan lines.

* * * * *